439-629 X
M3045 X3 RE 32,290

United States Patent [19]
Asick et al.

[11] E Patent Number: Re. 32,290
[45] Reissued Date of Patent: Nov. 18, 1986

[54] INPUT/OUTPUT INTERCARD CONNECTOR

[75] Inventors: John C. D. Asick, Harrisburg; George H. Douty, Mifflintown; John M. Landis, Camp Hill; Clair W. Snyder, Jr., York; James S. Staron, Millersburg, all of Pa.

[73] Assignee: AMP Incorporated, Harrisburg, Pa.

[21] Appl. No.: 766,470

[22] Filed: Aug. 19, 1985

Related U.S. Patent Documents

Reissue of:
[64] Patent No.: 4,506,940
Issued: Mar. 26, 1985
Appl. No.: 505,151
Filed: Jun. 17, 1983

[51] Int. Cl.[4] ..... H01R 23/72
[52] U.S. Cl. ..... 339/17 LC
[58] Field of Search ..... 339/17 R, 17 C, 17 LC, 339/17 LM, 17 M, 17 L, 17 N, 19, 176 MP, 176 M, 176 MF, 97 P, 99 R, 217 S

[56] References Cited

U.S. PATENT DOCUMENTS

| | | | |
|---|---|---|---|
| 3,192,445 | 6/1965 | Evans et al. | 361/394 |
| 3,245,024 | 4/1966 | Evans | 339/17 |
| 3,253,190 | 5/1966 | Evans | 361/394 |
| 3,264,525 | 8/1966 | Swengel et al. | 361/394 |
| 3,299,392 | 1/1967 | Evans | 339/17 |
| 3,411,130 | 11/1968 | Bushey | 339/176 |
| 3,715,629 | 2/1973 | Swengel | 339/258 R |
| 4,153,326 | 5/1979 | Frantz et al. | 339/99 R |
| 4,337,989 | 7/1982 | Asick et al. | 339/143 R |
| 4,363,530 | 12/1982 | Verhoeven | 339/17 C |
| 4,384,754 | 5/1983 | Douty et al. | 339/17 M |

*Primary Examiner*—Neil Abrams
*Attorney, Agent, or Firm*—F. Brice Faller; Adrian J. LaRue; Bruce J. Wolstoncroft

[57] ABSTRACT

An intercard connector system is formed by a connector matable with a circuit board mounted header assembly. The connector carries a plurality of terminals each having a first end profiled to engage a conductor and an opposite second end profiled to engage a pin terminal of the header assembly. The profiling of the connector and header assemblies are such as to allow multiple configurations in high density arrays.

11 Claims, 3 Drawing Figures

(2)

INPUT/OUTPUT INTERCARD CONNECTOR

Matter enclosed in heavy brackets [ ] appears in the original patent but forms no part of this reissue specification; matter printed in italics indicates the additions made by reissue.

The present invention relates to a system for connecting closely spaced devices, such as circuit boards, to cables and the like.

The current state of electronics technology requires the maximum number of interconnects in the minimum amount of space. The connector systems heretofor available have not been able to fulfill these requirements.

The present invention concerns an interconnection system which includes a connector member matable with a header assembly mounted on a circuit board or the like. Each connector carries therein a plurality of electrical terminals, each having at least one portion profiled to mate with a terminal mounted in the header assembly, and another portion profiled to engage a conductor. The header assembly includes at least one header member mounted on a first side of a circuit board or the like and containing a plurality of pin terminals which are electrically and mechanically connected to circuitry on the circuit board. The connector and header are profiled for mating.

Embodiments of the present invention will now be described by way of example with reference to the following figures.

Figure 1:
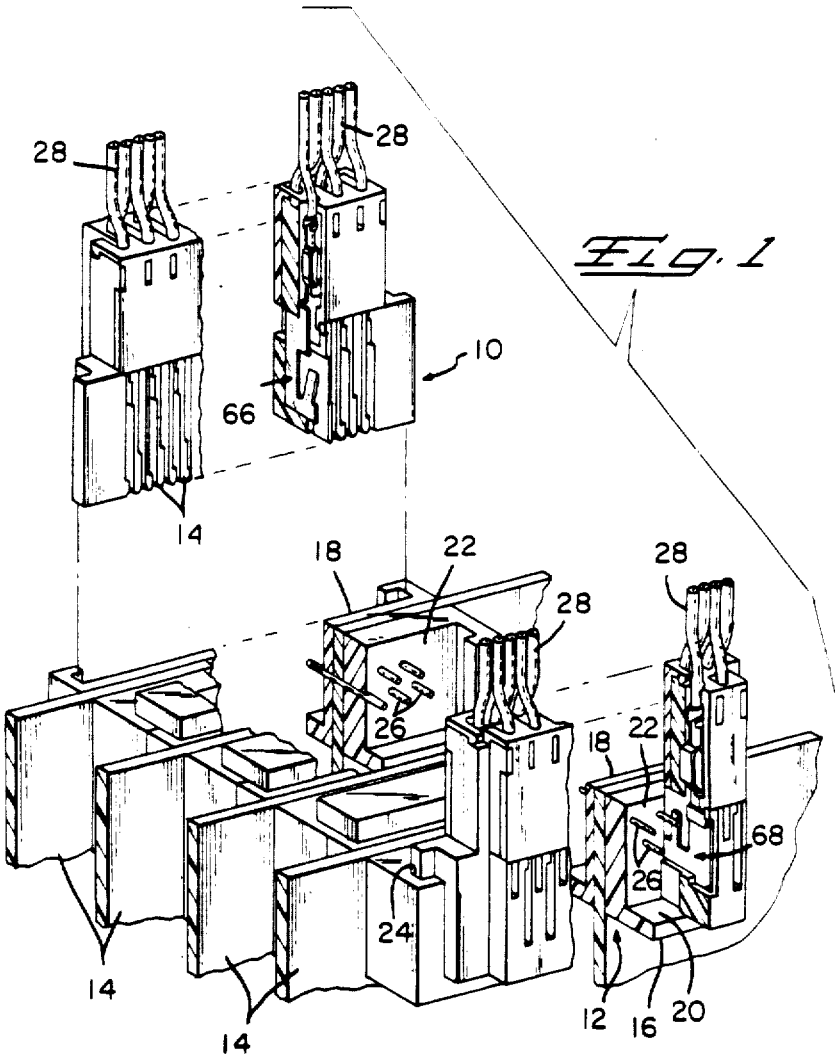
FIG. 1 is a perspective view, partially in section and partially exploded, showing an input output connector according to the subject invention.

FIG. 1 is a perspective view showing the subject input output connector 10 in both mated and unmated conditions with respect to the header assemblies 12 on the circuit boards 14. Each header assembly comprises at least one elongated header member 16, 18 of rigid insulative material defining a receptor cavity 20 and mating face 22. Ends of the cavity are profiled to form groover 24. A plurality of pin terminals 26 are mounted in the header member in a spaced array, each with one end exposed from the mating face 22 and contacting circuitry of the respective circuit board 14. The pin terminals 26 may be continuous, passing through conductive holes (not shown) in the circuit board to extend from mating faces 22 of both header members 16, 18.

The 10 connector input output is shown terminating a multi-conductor flat cable 28, although individual conductors could likewise be terminated. The connector 10 has an elongated housing 30 of rigid insulative material with a plurality of slots 32, 34 formed in parallel spaced relation on opposite sides thereof extending. The housing has a front end 36, a rear end 38, a mating surface 40, lateral flanges 42, 44, and a transverse rear slot 46. It will be noted, from FIG. 1, that the slots 32 extend between the front and rear ends 36, 38 while the slots 34 do not quite reach the front end. Both sets of slots 32, 34 have profiled rear ends having the shape of outwardly opening channels with shoulders 48.

The connector 10 also has a pair of covers 50, 52 each of which has a plurality of tines 54, 56 on a forward leading edge and a plurality of parallel spaced legs 58, 60 depending from a rear edge and with a forwardly directed shoulder 62, 64 at the free end thereof. Each tine 54, 56 is received in a respective slot 32, 34 to engage shoulder 48 while the shoulders 64, 64 of the legs 58, 60 engage opposite sides of slot 46 to secure the covers in place on opposite sides to the connector.

Figure 2:
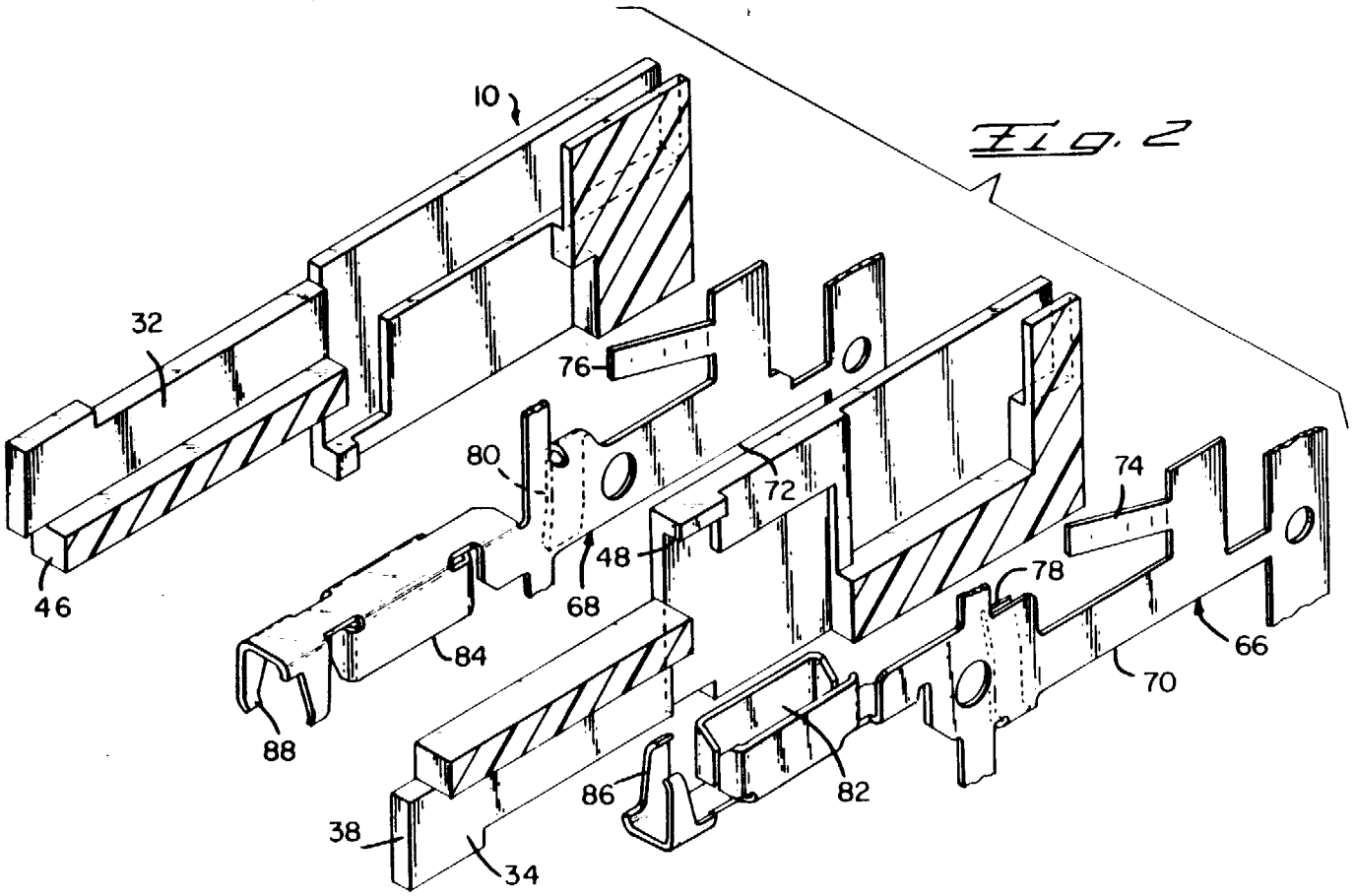
FIG. 2 is an exploded section through the input output connector of FIG. 1.
Figure 3:
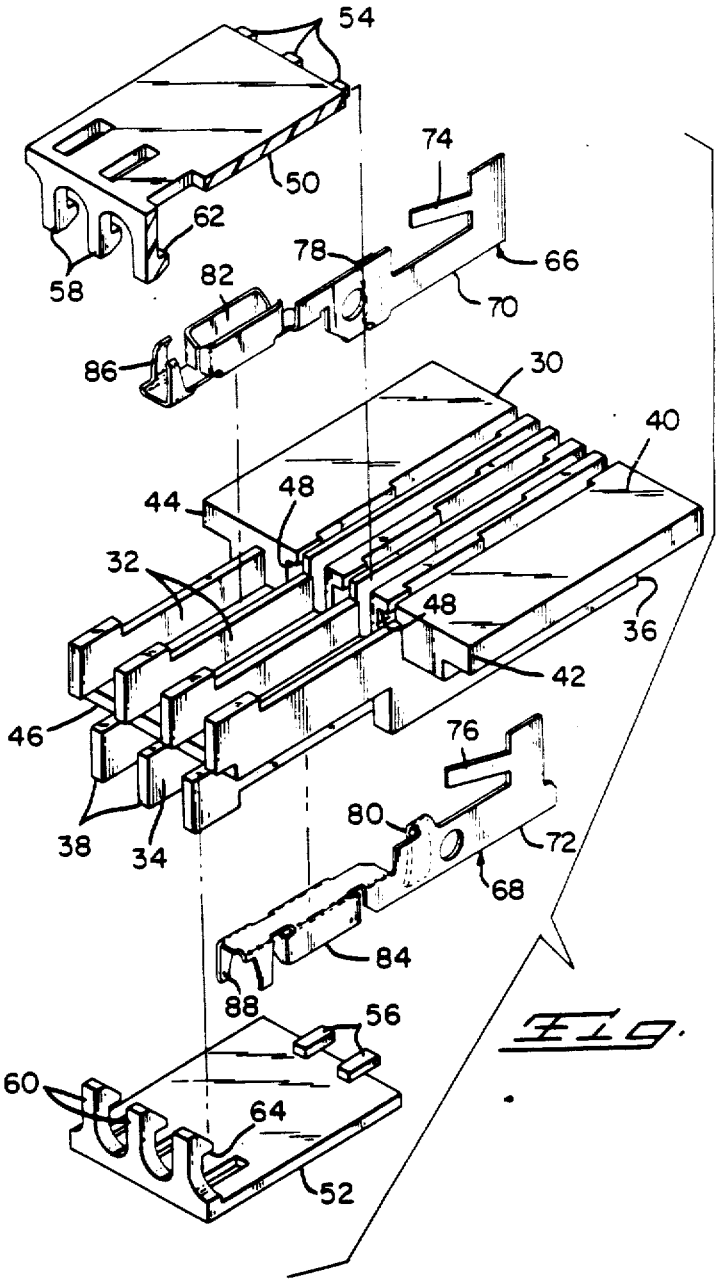
FIG. 3 is a perspective view of the housing of the input output connector of FIG. 2 with the covers exploded therefrom.

The connector is also provided with a plurality of terminals 66, 68. Each terminal is stamped and formed from conductive slack material and has a blade portion 70, 72, a resilient cantilever beam 74, 76, a mounting tab 78, 80, an insulation piercing conductor engaging portion 84, 84 and a conductor engaging strain relief portion 86, 88. The beams 74, 76 and blades 70, 72 are common at one end and extend generally parallel to each other. The beams, however, are canted out of the plane of the blades to provide a resilient bias when engaged by a respective pin terminal 26. The mounting tabs 78, 80 serve to lock and stabilize the terminals in the housing. The insulation piercing, conductor engaging portions 82, 84 of the terminals are oppositely directed for reasons which can best be appreciated from FIG. 2. This allows the terminals to be on a close centerline spacing and for termination on opposite sides of the connector by adjacent conductors of the cable 28.

The connector 10 is assembled by first preloading the terminals 66, 68 in the respective grooves 32, 34. This can be accomplished either by side loading or end loading the terminals as is convenient. Next the individual conductors of the cable 28 are terminated in the respective terminal in the manner described in U.S. Pat. No. 4,343,085, the disclosure of which is incorporated herein by reference. Then the covers 50, 52 are assembled on the connector by inserting tines 54, 56 under shoulders 48 and engaging shoulders 62, 64 in groove 46. It will be appreciated that this will also separate the individual conductors.

The thus terminated connector 10 can be mated with a header 12 by mating in a plane parallel to the plane of the circuit board 14. It will be appreciated from FIG. 1 that this connector provides a very low profile, high density interconnection.

We claim:

1. An intercard connector system comprising an elongated header member of rigid insulative material having oppositely directed mounting and mating surfaces, said header member having the mounting surface engaging a circuit board, profiled means at each end of said header member allowing mating only in a direction coplanar to said mating surface, a plurality of pin terminals mounted in said header member in patterned array with one end of each terminal engaging circuitry of said circuit board and the other end projecting from said mating surface; and a connector member having an elongated housing of rigid insulative material having a mating portion profiled to be received in said header member in a direction parallel and adjacent to said mating surface and a terminating portion, a plurality of terminal passages each extending between said mating and terminating portions with adjacent passages opening in opposite directions at said terminating portion enabling said passages to have a close centerline spacing, and a plurality of first and second terminals alternating in adjacent ones of said passages, each said terminal having a conductor engaging first end and a pin engaging second end, the first ends of said first terminals opening in one direction and the first ends of said second terminals opening in the opposite direction, said first and second terminals being inserted alternately into adjacent passages in a direction normal to the axis of said passage so that said first ends are accessible from the respective sides of said connector and said second ends are accessible only from the mating face.

2. An intercard connector system according to claim 1 wherein a pair of header members are mounted on opposite sides of a circuit board and each pin terminal extends through said circuit board with end portions extending from the mating surfaces of respective header members.

3. An intercard connector system according to claim 1 wherein each said terminal of said connector member has a conductor engaging first end formed by at least one insulation piercing slot.

4. A intercard connector system according to claim 1 further comprising a cover engagable with said connector member to enclose said termination portion thereof.

5. An intercard-connector system according to claim 1 wherein each said pin engaging second end of each terminal of said connector member is planar with at least one cantilever beam which receives a respective pin terminal normal to the axis of the beam and by moving said connector parallel to the axis of the terminals carried thereby.

6. An intercard connector system according to claim 1 further comprising a pair of covers mounted on opposite sides of said connector housing so as to enclose the conductor engaging ends of the terminals mounted therein.

7. An intercard connector system according to claim 1 wherein each said terminal in said connector member further comprises latching/stabilizing means.

*8. A connector system comprising*

*a header member having a mating face in a connector receiving cavity profiled to receive a mating connector in a direction parallel to said mating face and a plurality of contacts each with one end extending from the mating face,*

*a connector member comprising a housing having a front mating end profiled for reception in said cavity, a rear terminating end, and a plurality of terminal passages extending therebetween, said mating end having a mating surface for reception against said mating face, said passages opening at said mating end as a plurality of parallel slots on said mating surface and at said terminating end as a plurality of parallel channels on opposite sides of said housing, adjacent slots extending to channels on opposite sides, alternate slots extending to channels on the same side, said connector member further comprising a plurality of terminals in respective passages, each terminal having a conductor engaging portion in a respective channel for being joined to an electrical wire and a contact engaging portion in a respective slot, said slots being spaced so that each slot receives one of said ends of said respective contacts for engagement by said contact engaging portion.*

*9. A connector system as in claim 8 wherein each said contact engaging portion comprises a cantilever beam which is resiliently biased to engage one of said ends of said contacts when said mating end is received in said cavity.*

*10. A connector system as in claim 8 wherein said header further comprises a mounting surface oppositely directed from said mating surface.*

*11. A connector system as in claim 10 wherein said contacts are pin terminals each having an end extending from the mounting surface.*

* * * * *